United States Patent
Takahashi (10) Patent No.: US 7,945,298 B2
(45) Date of Patent: May 17, 2011

(54) WIRELESS TERMINAL

(75) Inventor: Shin Takahashi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 452 days.

(21) Appl. No.: 11/283,157

(22) Filed: Nov. 18, 2005

(65) Prior Publication Data

US 2006/0116181 A1    Jun. 1, 2006

(30) Foreign Application Priority Data

Nov. 26, 2004 (JP) ................................. 2004-342792

(51) Int. Cl.
*H04M 1/00* (2006.01)
(52) U.S. Cl. .................. 455/575.3; 455/575.1; 455/90.3
(58) Field of Classification Search .................. None
See application file for complete search history.

(56) References Cited

U.S. PATENT DOCUMENTS

| | | | | |
|---|---|---|---|---|
| 6,754,507 B2 * | 6/2004 | Takagi | ....................... | 455/550.1 |
| 6,873,520 B2 * | 3/2005 | Takagi et al. | ................. | 361/679 |
| 7,283,853 B2 * | 10/2007 | Kanazawa et al. | ......... | 455/575.1 |
| 2003/0179143 A1 | 9/2003 | Iwai et al. | | |
| 2004/0224729 A1 * | 11/2004 | Watanabe et al. | .......... | 455/575.3 |
| 2007/0105602 A1 * | 5/2007 | Takebe | ....................... | 455/575.3 |

FOREIGN PATENT DOCUMENTS

| | | |
|---|---|---|
| CN | 1433104 A | 7/2003 |
| JP | 04-110007 | 9/1992 |

OTHER PUBLICATIONS

English translation of Chinese office action for corresponding Chinese application No. 2005101272131 lists the references above.

* cited by examiner

*Primary Examiner* — Zhiyu Lu
(74) *Attorney, Agent, or Firm* — DLA Piper LLP (US)

(57) ABSTRACT

A wireless terminal able to suppress deterioration of antenna characteristics due to opening/closing of the terminal, that is, a wireless terminal comprising a first housing and a second housing having inside them circuit boards on which ground conductive layers are formed, a connection member for connecting ends of the first housing and second housing with each other so that they can be open or closed, a built-in antenna arranged in one housing between the first housing and second housing and at the end on an opposite side to the connection member, and a ground conductive member for electrically connecting ground conductive layers of the circuit boards arranged in the first housing and second housing to each other, constituted so that a portion of the connection member includes a conductive member, and the ground conductive member is brought into contact with the conductive member.

16 Claims, 11 Drawing Sheets

WIRELESS TERMINAL

BACKGROUND OF THE INVENTION

1. Field of Invention

The present invention relates to a mobile phone or other wireless terminal, more particularly relates to a wireless terminal connecting two housings so that they can be opened and closed and having a built-in antenna in one housing.

2. Description of the Related Art

In recent years, mobile phones, personal digital assistants (PDAs) having wireless functions, and other mobile wireless terminals provided with a first housing, a second housing, and a hinge pivotally connecting these first housing and second housing and constituted so that the two housings can be flipped opened have become popular.

Now, however, smart designs are now being demanded from wireless communication terminals. Along with the smaller size of the antennas, it has been proposed to replace the antenna sticking out from the housing with an antenna arranged inside the first housing or the second housing forming the wireless terminal (see for example Japanese Unexamined Utility Model Publication (Kokai) No. 4-110007). The wireless terminal disclosed in Japanese Unexamined Utility Model Publication (Kokai) No. 4-110007 arranges a built-in antenna in at the end of the housing on the opposite side to a connection member connecting the two housings in order to prevent the signal from being blocked due to the position of the built-in antenna.

However, in for example a flip-open type wireless terminal etc. structured so that the two housings can be superposed on each other in the closed state and so that the facing surfaces of two housings can be exposed to the outside in the opened state, a performance of an equivalent level to the antenna characteristics of a wireless terminal having an external antenna was hard to obtain for the antenna characteristics in the opened state.

SUMMARY OF THE INVENTION

An object of the present invention is to provide a wireless terminal able to suppress deterioration of antenna characteristics due to opening/closing of the terminal.

According to a first aspect of the present invention, there is provided a wireless terminal comprising a first housing and a second housing having inside them circuit boards on which ground conductive layers are formed, a connection member for connecting ends of the first housing and second housing with each other so that the housings open and close with respect to each other, a built-in antenna arranged in one housing and at the end on an opposite side to the connection member, and a ground conductive member for electrically connecting ground conductive layers of the circuit boards arranged in the first housing and second housing to each other, wherein a portion of the connection member includes a conductive member, and the ground conductive member is brought into contact with the conductive member.

Preferably, a first electrical/audio converter is arranged in the first housing, and a second electrical/audio converter is arranged in the second housing.

Preferably, the built-in antenna is arranged in the first housing, the first electrical/audio converter includes a microphone, and the second electrical/audio converter includes a speaker.

Preferably, the ground conductive member is formed by a coaxial cable, and the coaxial cable is brought into contact with the conductive member.

Preferably, the conductive member of the connection member is provided in one housing and is electrically connected to the ground conductive layer of the circuit board arranged in the one housing.

Preferably, the circuit board arranged in the above housing is provided with a shield case, and the conductive member of the connection member and the ground conductive member are connected through the shield case.

Preferably, the first housing and the second housing are pivotally connected so that the housings open and close, and the conductive member of the connection member forms a pivoting axis supporting the pivotal operations of the housings.

Preferably, the ground conductive member is formed by a coaxial cable, a guide groove is formed on the pivoting axis constituting the conductive member, and the coaxial cable is arranged in the guide groove.

According to the present invention, the deterioration of the antenna characteristics due to the opening/closing of the wireless terminal can be suppressed.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, an embodiment of the present invention will be explained with reference to the attached drawings.

Figure 1:
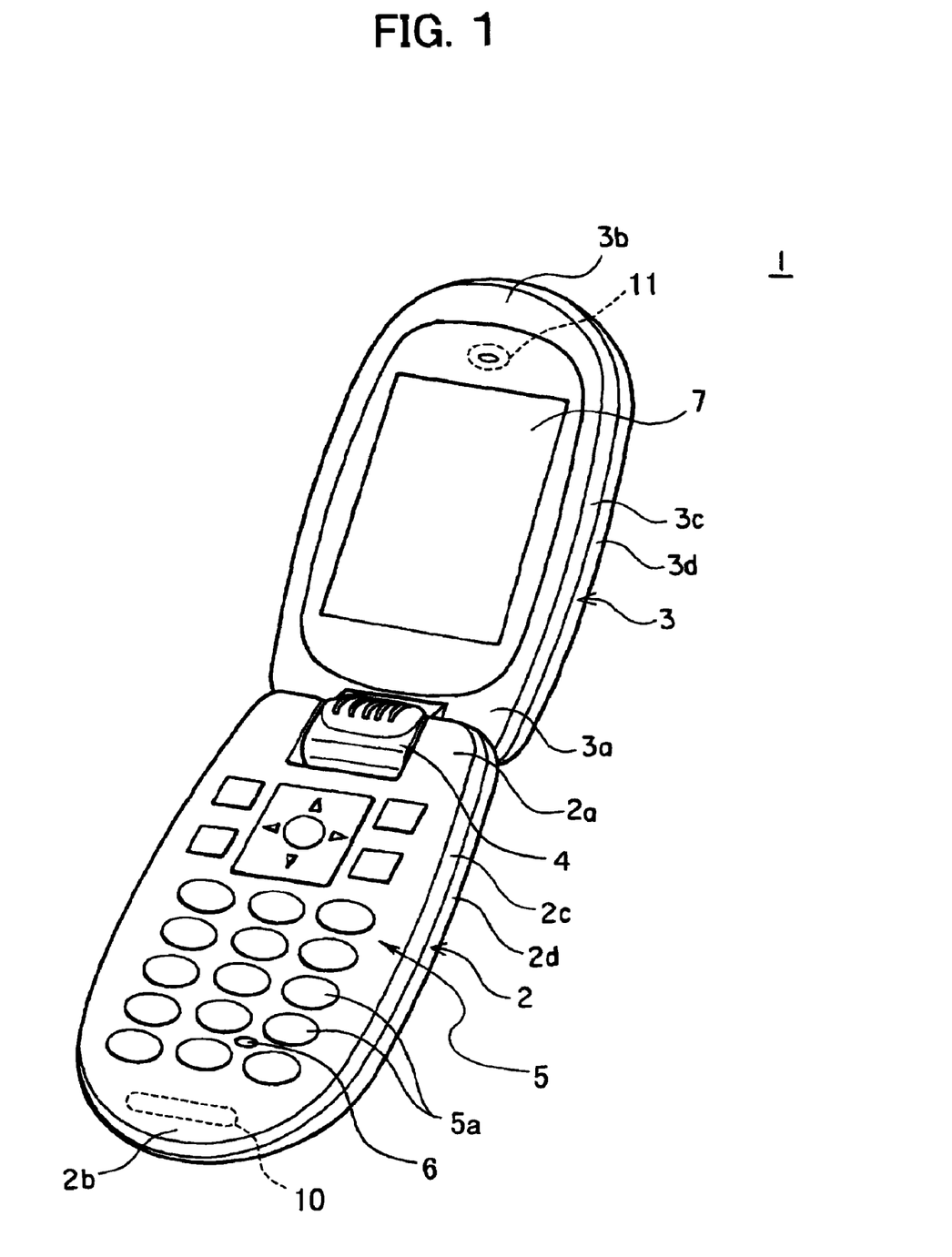
FIG. 1 is a perspective view of an outer appearance of a mobile phone to which the present invention is applied in an opened state.
Figure 2:
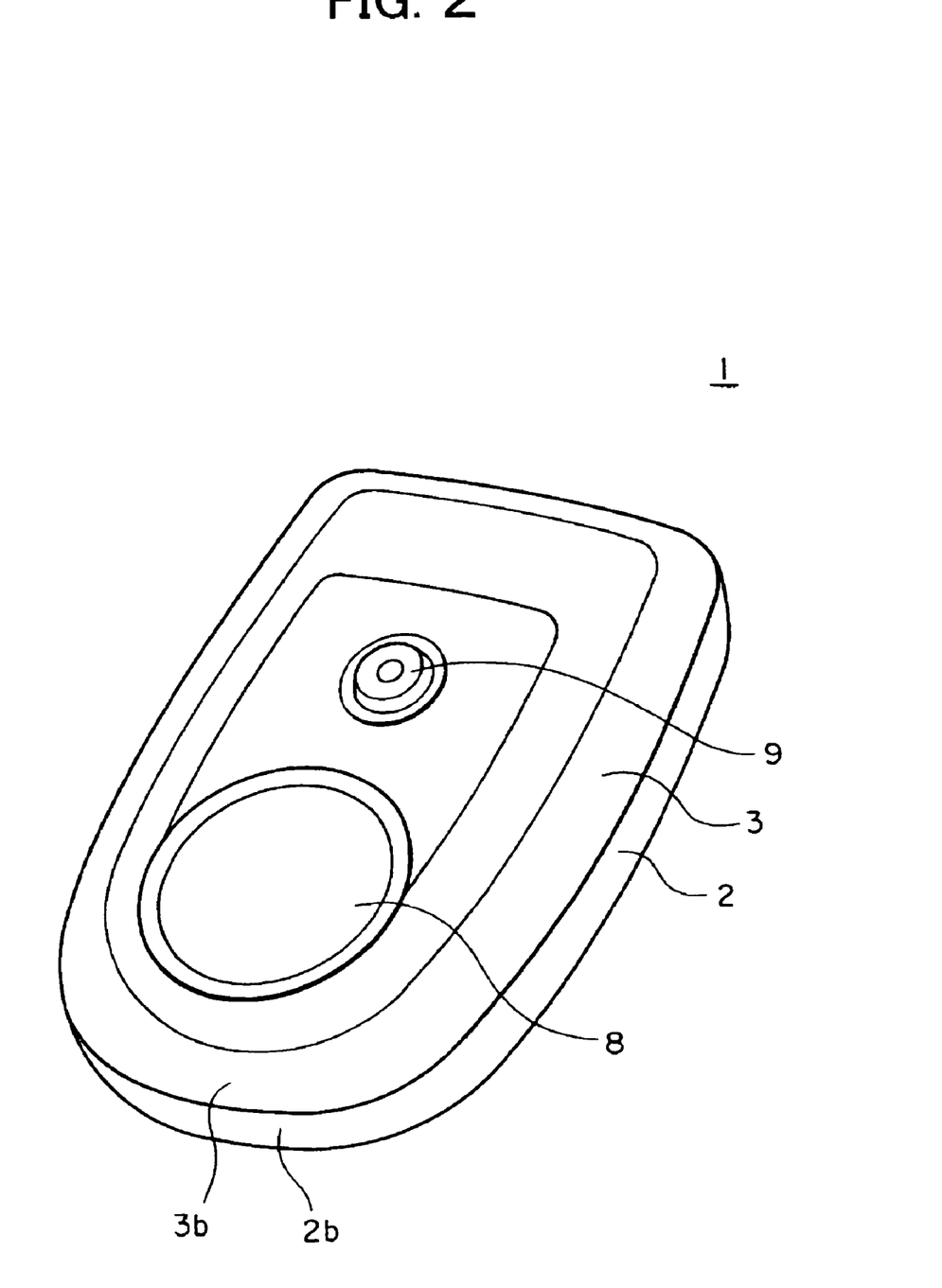
FIG. 2 is a perspective view of an outer appearance of the mobile phone of FIG. 1 in a closed state.

FIG. 1 and FIG. 2 are perspective views of the outer appearance of a wireless terminal of an embodiment of the present invention as constituted by a mobile phone. FIG. 1 shows an opened state, and FIG. 2 shows a closed state.

The mobile phone 1 is provided with a first housing 2 and a second housing 3 and is constituted so that it can be opened/closed by pivotally connecting an end 2a of the first housing 2 and an end 3a of the second housing 3 by a connection member (hinge) 4.

The first housing 2 and the second housing 3 are provided with front surface cases 2c and 3c on surfaces facing each other in the closed state (front surfaces) and back surface cases 2d and 3d on the back surfaces thereof. These front surface cases 2c and 3c are formed so that contours of surfaces facing each other when viewed from one housing to the other housing substantially coincide in the closed state. The positions of the ends 2b and 3b on the opposite side to the side of connection of the first housing 2 and the second housing 3 (opening/closing side) coincide with each other in the closed state.

The first housing 2 is provided with an operation unit 5 on the front surface. In the operation unit 5, various types of buttons for operating the mobile phone 1 such as tenkey buttons 5a are arranged. Further, the first housing 2 has a first electrical/audio converter constituted by a built-in microphone, while the front surface of the first housing 2 is provided with an opening 6 for collecting the voice of the user etc. to the microphone at the region of arrangement of the tenkey buttons 5a. Note that the opening 6 may be provided with a protective film for the purpose of preventing intrusion of dust into the first housing 2 etc.

The second housing 3 is provided with a main display (first display) 7 displaying an image etc. on the front surface and a sub display (second display) 8 displaying an image on its back surface. An opening window of the back surface case 3d for exposing the sub display 8 is formed circular. The main display 7 and the sub display 8 are constituted by for example transmission type or reflection type liquid crystal displays. Note that, for the displays, other devices such as organic EL's may be used too.

Further, the back surface of the second housing 3 is provided with a pushbutton (push member) 9 for controlling the operation of the sub display 8. The pushbutton 9 is constituted by for example a plastic or hard rubber and is arranged to be able to move in a direction perpendicular to the surface of the back surface case 3d where the sub display 8 is arranged.

In the mobile phone of the present embodiment constituted so that it can open/close by pivotally connecting the end 2a of the first housing 2 and the end 3a of the second housing 3 by the connection member (hinge) 4 in this way, a transmission/reception antenna 10 is built into the end 2b side of the first housing 2. Further, a speaker 11 as a second electrical/audio converter is built in the end 3b of the second housing 3. Further, in the present embodiment, when the first housing 2 and the second housing 3 are in the closed state, the antenna 10 is arranged facing to the vicinity of the speaker 11 as the electrical/audio converter arranged in the end 3b of the second housing 3, while when they are in the opened state, the antenna 10 is arranged away from the speaker 11.

As explained above, the first housing 2 and the second housing 3 are connected by the connection member 4 so that they can be opened/closed. As will be explained in detail later, the first housing 2 and the second housing 3 of the present embodiment have circuit boards formed with ground conductive layers inside them. The ground conductive layers of the circuit boards arranged in the first housing 2 and the second housing 3 are connected to each other by a ground conductive member passing through the connection member 4, specifically a thin coaxial cable comprised of signal lines coated by an insulator. The connection member 4 of the present embodiment, as schematically shown in FIG. 3, includes a conductive member 4a in one portion and is constituted so that the ground conductive member formed by the thin coaxial cable 12 contacts the conductive member 4a.

The reason for providing the conductive member 4a in the connection member 4 and bringing the ground conductive member formed by the thin coaxial cable 12 into contact with this conductive member 4a in this way will be explained with reference to FIG. 3 and FIG. 4.

Usually, in the case of a flip-open type wireless terminal constituted by a mobile phone, use is made of a flexible wiring board and a thin coaxial cable for connecting the first housing 2 and the second housing 3. When the antenna 10 is built in the first housing 2 as in the present embodiment, in the opened state, the antenna gain greatly varies according to whether a high frequency current smoothly flows between the first housing 2 and the second housing 3. When not configured providing the conductive member 4a in the connection member 4 and making the ground conductive member formed by the thin coaxial cable 12 contact this conductive member 4a as in the present embodiment, a high frequency current flows as shown by the arrows in FIG. 4 when seen from the antenna 10. For example, a high frequency current flows from a connector CNT1 on the first housing 2 side to an upper end of a circuit board D. This prevents the flow to the second housing 3. This portion becomes a loss and causes a drop in the antenna gain.

Figure 3:
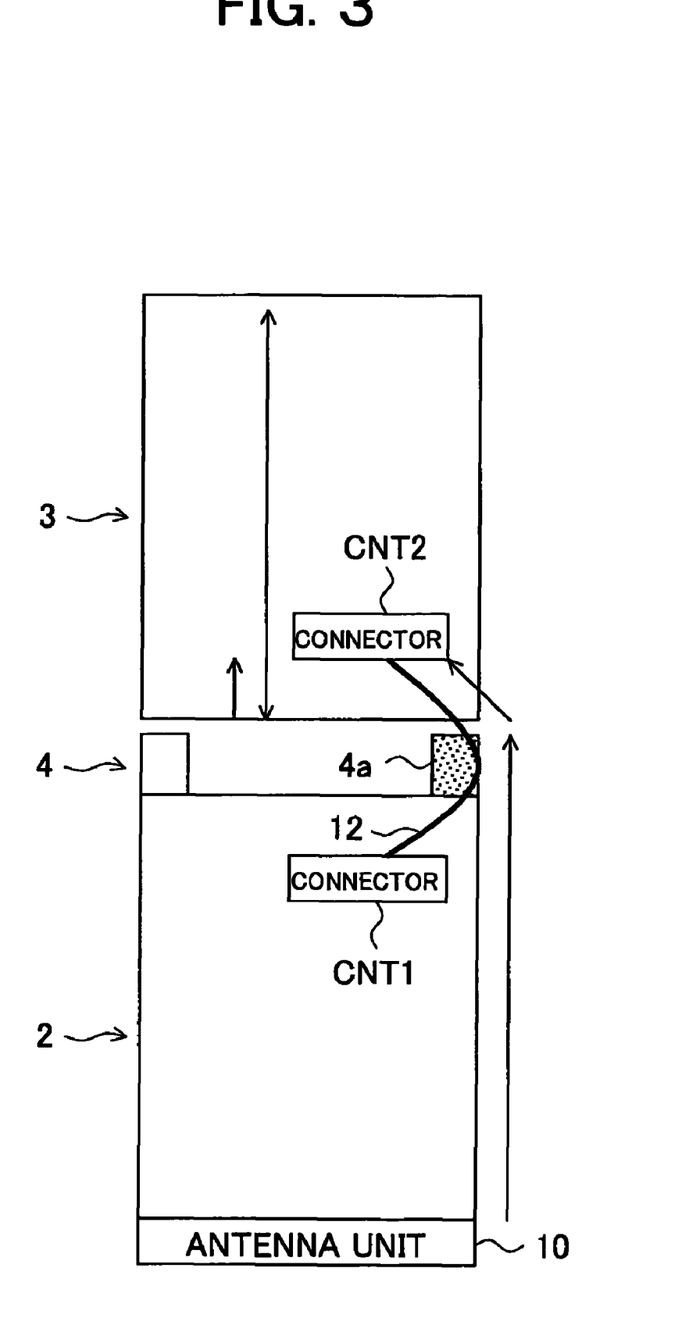
FIG. 3 is a conceptual view for explaining a flow of a high frequency when a conductive member is provided at a connection member and a ground conductive member constituted by a thin coaxial cable is brought into contact with this conductive member.
Figure 4:
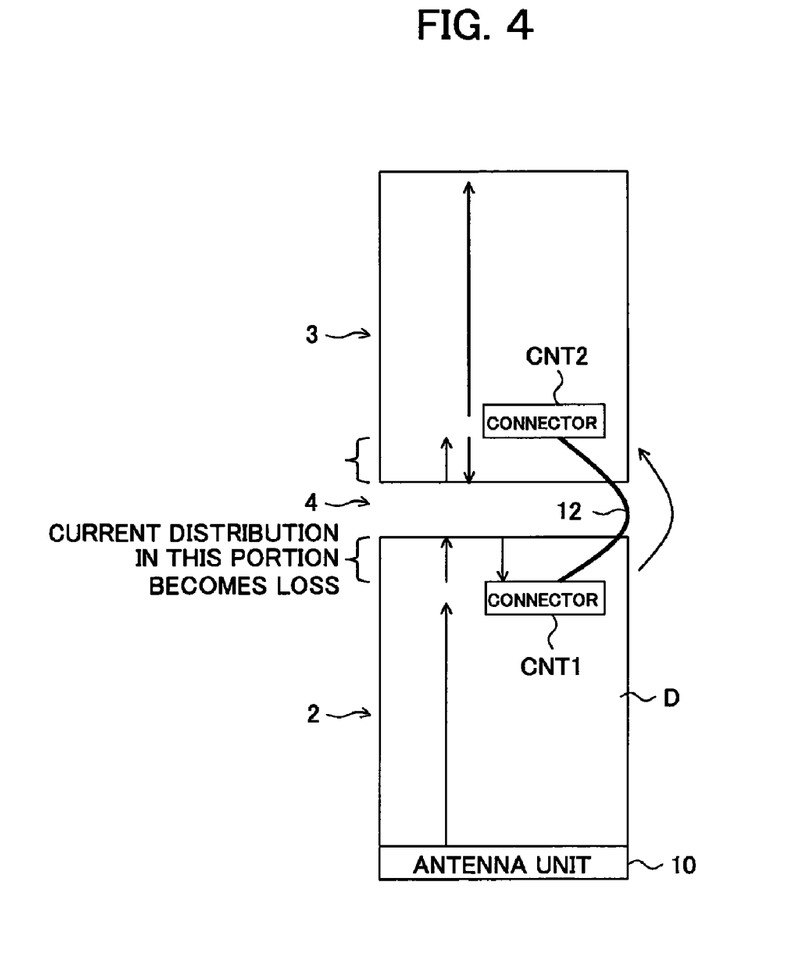
FIG. 4 is a conceptual view for explaining a flow of high frequency when a conductive member is provided at a connection member and a ground conductive member constituted by a thin coaxial cable is not brought into contact with this conductive member.

Contrary to this, when configured providing the conductive member 4a in the connection member 4 and making the ground conductive member formed by the thin coaxial cable 12 into contact with this conductive member 4a as in the present embodiment, as shown in FIG. 3, the cable 12 appears to start from the upper end of the connection member 4 in terms of high frequency, and a high frequency current smoothly flows in the second housing 3 unlike the case of FIG. 4. In this way, it is considered that the antenna gain is improved by the smooth flow of the high frequency current. The connection member 4 and the cable 12 need not be directly connected (an outer coating of the thin coaxial cable 12 is an insulator). A high frequency current flows and it is possible to raise the antenna gain so far as they are in close contact.

Figure 5:
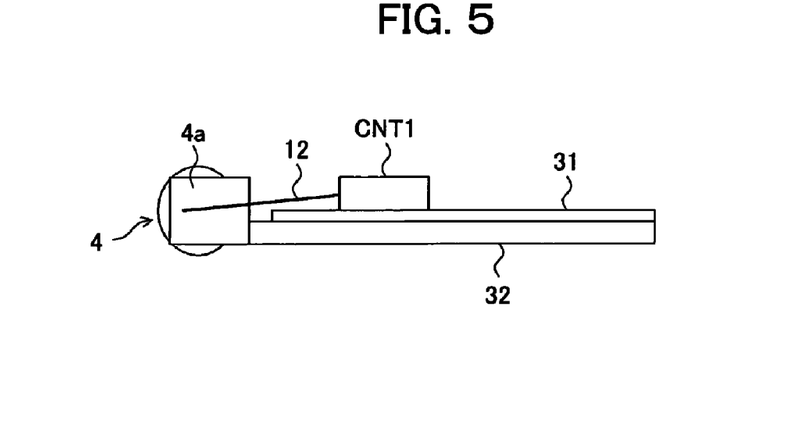
FIG. 5 is a diagram schematically showing a first example of a configuration in which a conductive member is provided at a connection member and a ground conductive member constituted by a thin coaxial cable is brought into contact with this conductive member.
Figure 6:
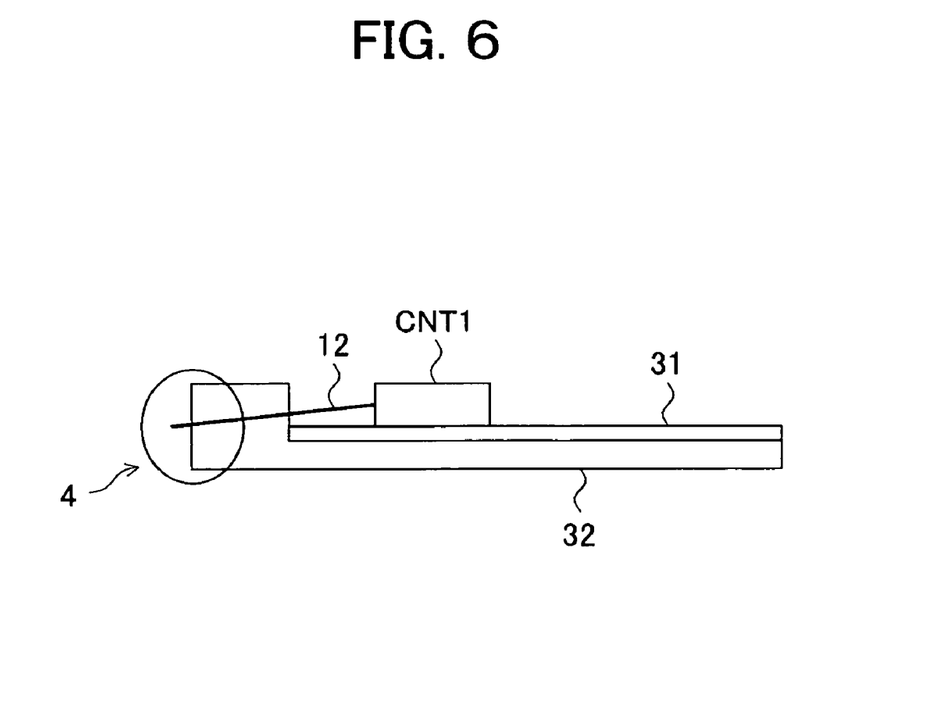
FIG. 6 is a diagram schematically showing a second example of a configuration in which a conductive member is provided at a connection member and a ground conductive member constituted by a thin coaxial cable is brought into contact with this conductive member.
Figure 7:
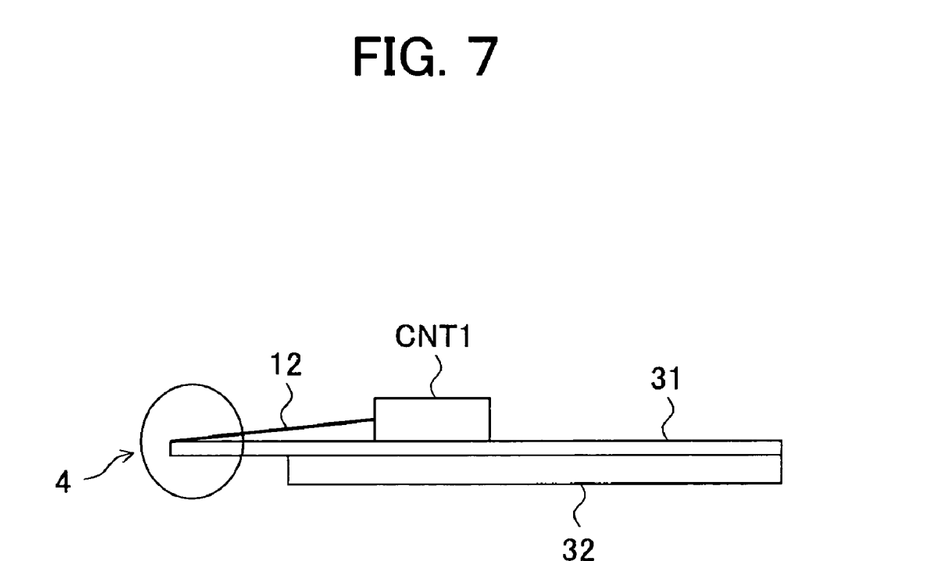
FIG. 7 is a diagram schematically showing a third example of a configuration in which a conductive member is provided at a connection member and a ground conductive member constituted by a thin coaxial cable is brought into contact with this conductive member.

When schematically showing the above configuration, it is possible to employ for example the configurations as shown in FIG. 5, FIG. 6, and FIG. 7.

In the configuration of FIG. 5, a metal member as the conductive member 4a is used for the connection member 4 through which the cable 12 passes, and the metal member 4a and a shield case 32 connected to the ground conductive layer of the circuit board 31 are connected for conduction. In this case, it is also possible to use a leaf spring etc. for securing the conduction between the connection member 4 and the shield case 32.

In the configuration of FIG. 6, the shield case 32 connected to the ground conductive layer of the circuit board 31 is extended to the inside of the connection member 4, the cable 12 is passed along the extended portion, and the cable 12 is contacted with the extended shield case 32.

In the configuration of FIG. 7, the circuit board 31 connected with the shield case 32 by the ground conductive layers extends into the connection member 4 so that the ground conductive layer provided at the end of the extended board contacts the cable 12.

Above, the measures for suppressing deterioration of the antenna characteristics due to the opening/closing of the terminal in the mobile phone of the present embodiment were explained with reference to schematic drawings.

Below, the specific structure for reducing the amount of change of the antenna characteristics due to the opening/closing of the terminal will be explained with reference to the drawings.

Figure 8:
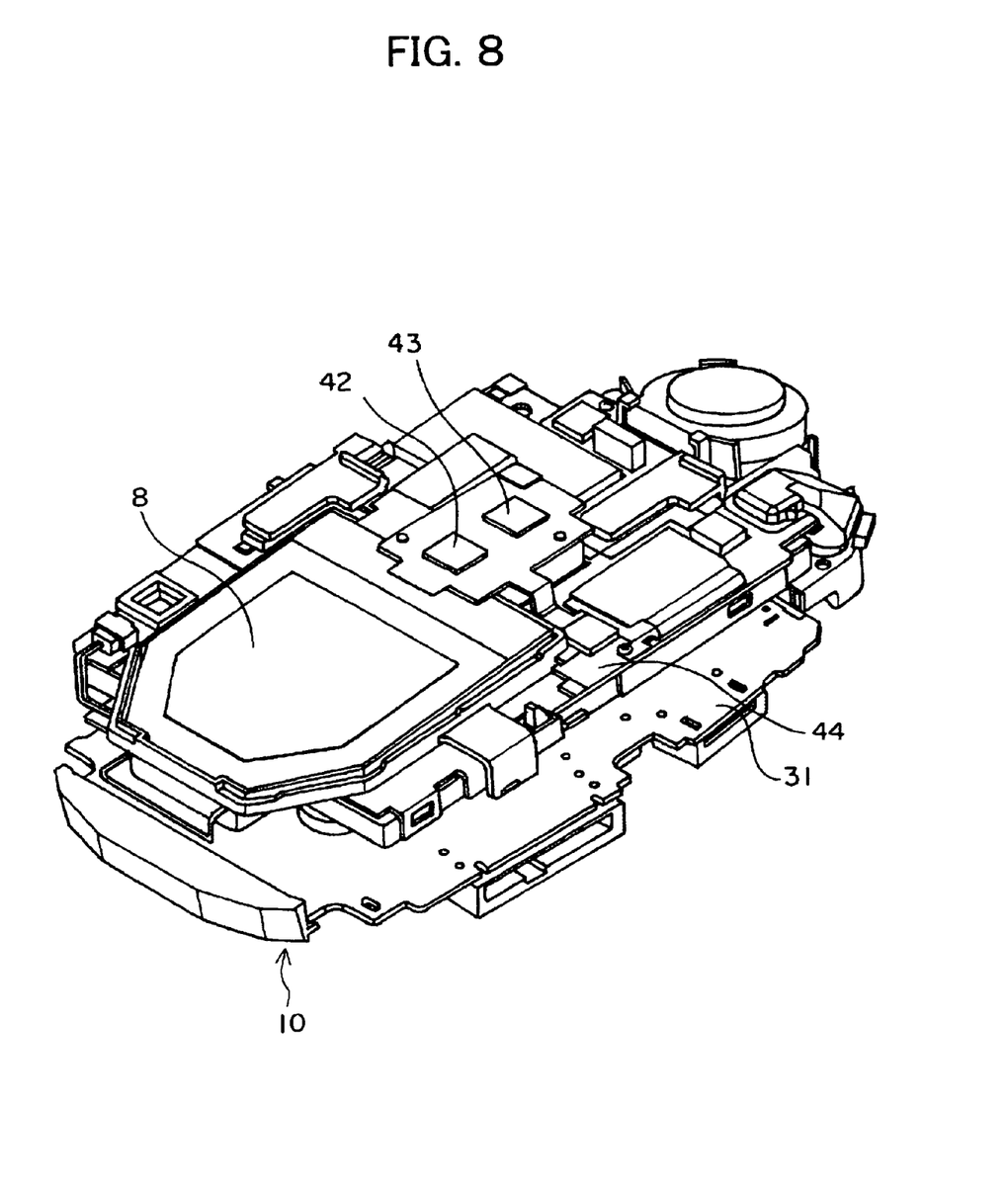
FIG. 8 is a perspective view showing a portion of the internal configuration of the mobile phone of FIG. 1 in the closed state.
Figure 9:
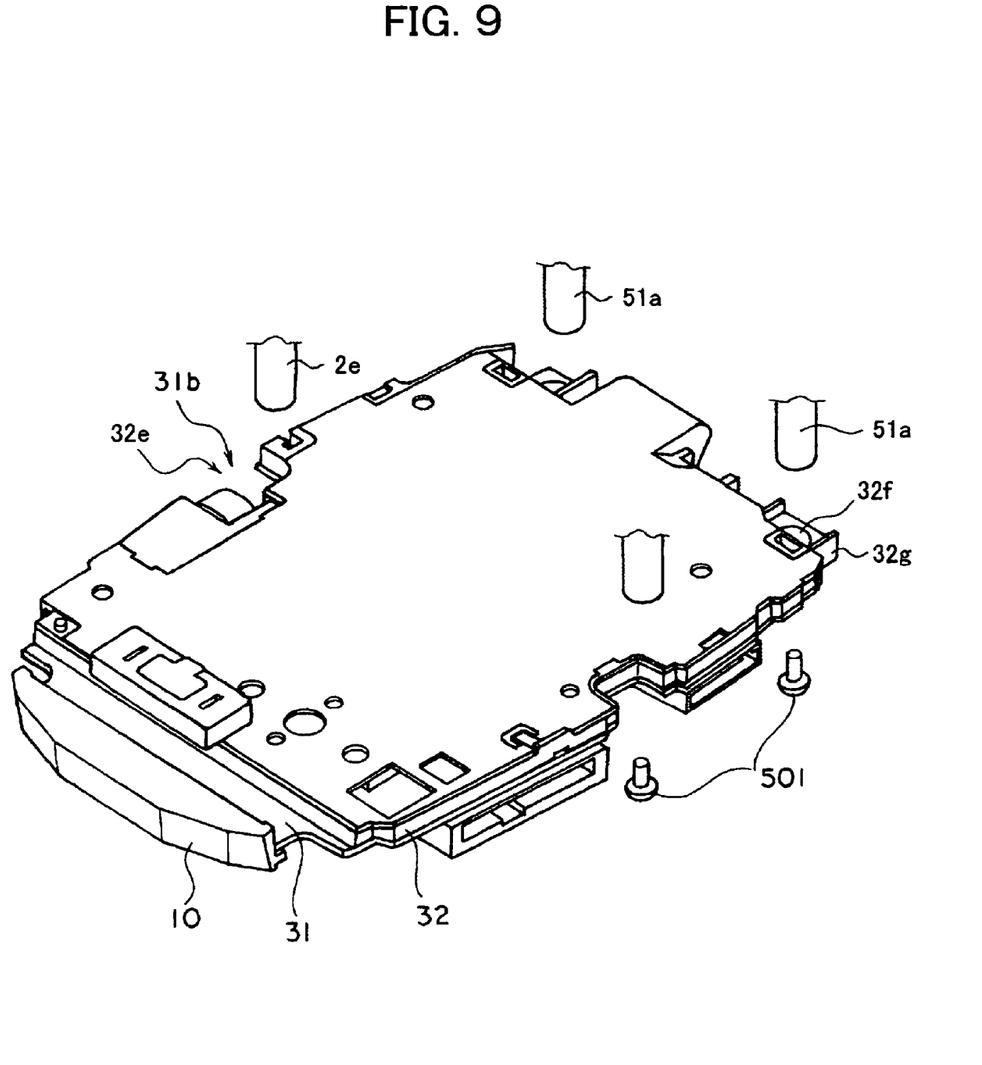
FIG. 9 is a perspective view showing a portion of the internal configuration of the first housing of the mobile phone of FIG. 1 in the closed state.

FIG. 8 is a perspective view showing an internal configuration of the mobile phone 1 in the closed state, while FIG. 9 is a perspective view showing the internal configuration of the first housing 2. Note that both of FIG. 8 and FIG. 9 are shown omitting some of the components.

The first housing 2 is provided inside it with a circuit board 31 on which high frequency circuits and various other types of circuits are arranged, a shield case (shield body) 32 for blocking electromagnetic waves released from the circuits on the circuit board 31 or entering from the outside (refer to FIG. 9), and a transmission/reception antenna 10 for transmitting and receiving radio signals. The antenna unit 10 is provided at the end of the circuit board 31 and located inside the end 2b of the first housing 2.

The circuit board 31 is constituted as for example a multi-layer printed circuit board formed by stacking a pattern layer, an insulation layer, a ground layer, and a power supply layer. The circuit board 31 is connected to a not shown battery to be supplied with power. The shield case 32 is formed by plating the surface of a base formed by for example a plastic and therefore is conductive at its outer surface. Further, the shield case 32 has a surface parallel to the circuit board 31 and walls extending from this parallel surface to the circuit board 31 side and dividing the parallel surface into sections. The walls abut against the circuit board 31. Electronic parts etc. on the circuit board 31 are accommodated among these walls.

The circuit board 31 and the shield case 32 are arranged so as to extend over substantially the entire area of the first housing 2 when viewing the first housing 2 from the front surface. The circuit board 31 and the shield case 32 are fastened to each other and, at the same time, the shield case 32 and the ground layer of the circuit board 31 are electrically connected by screwing conductive screws inserted into through holes provided in for example the circuit board 31 with screw bosses provided in the shield case 32 (neither shown).

The circuit board 31 and the shield case 32 are fastened in the first housing 2 along with the fastening of the front surface case 2c and the back surface case 2d. Namely, the front surface case 2c and the back surface case 2d are fastened by screwing screws 501 passed through the back surface case 2d with screw bosses 2e and 51a provided on the back side of the front surface case 2c, while recesses 31b and 32e and holes 32f are provided in the circuit board 31 and the shield case 32 and the screw bosses 2e and 51a are fit in these recesses and holes to fasten the circuit board 31 and the shield case 32 to the first housing 2. Note that, along with such fastening to the first housing 2, the circuit board 31 and the shield case 32 are further tightly fastened. The shield case 32 is provided with a hinge part fastening portion 32g, to which hinge parts 53 and 54 explained later are fixed, projecting out to the hinge 4 side. Holes 32f are provided in the hinge part fastening portion 32g.

The second housing 3 is provided inside it with a main display 7 (refer to FIG. 1), a circuit board 44 for performing predetermined control such as power supply control of the main display 7, a sub display 8, a drive unit 42 for performing predetermined control such as power supply control of the sub display 8, and a depression switch 43 connected to the drive unit 42 and opening/closing the contacts in accordance with a depression operation. Note that all of the main display 7, circuit board 44, sub display 8, drive unit 42, and depression switch 43 function as electronic parts provided in the second housing 3 of the present invention. The circuit board 44 is constituted by for example a multi-layer printed circuit board in the same way as the circuit board 31. The drive unit 42 is constituted by for example an IC. The depression switch 43 has a pushbutton 9 (refer to FIG. 2) arranged above it. The depression switch 43 is depressed by the operation of the pushbutton 9.

Figure 10:
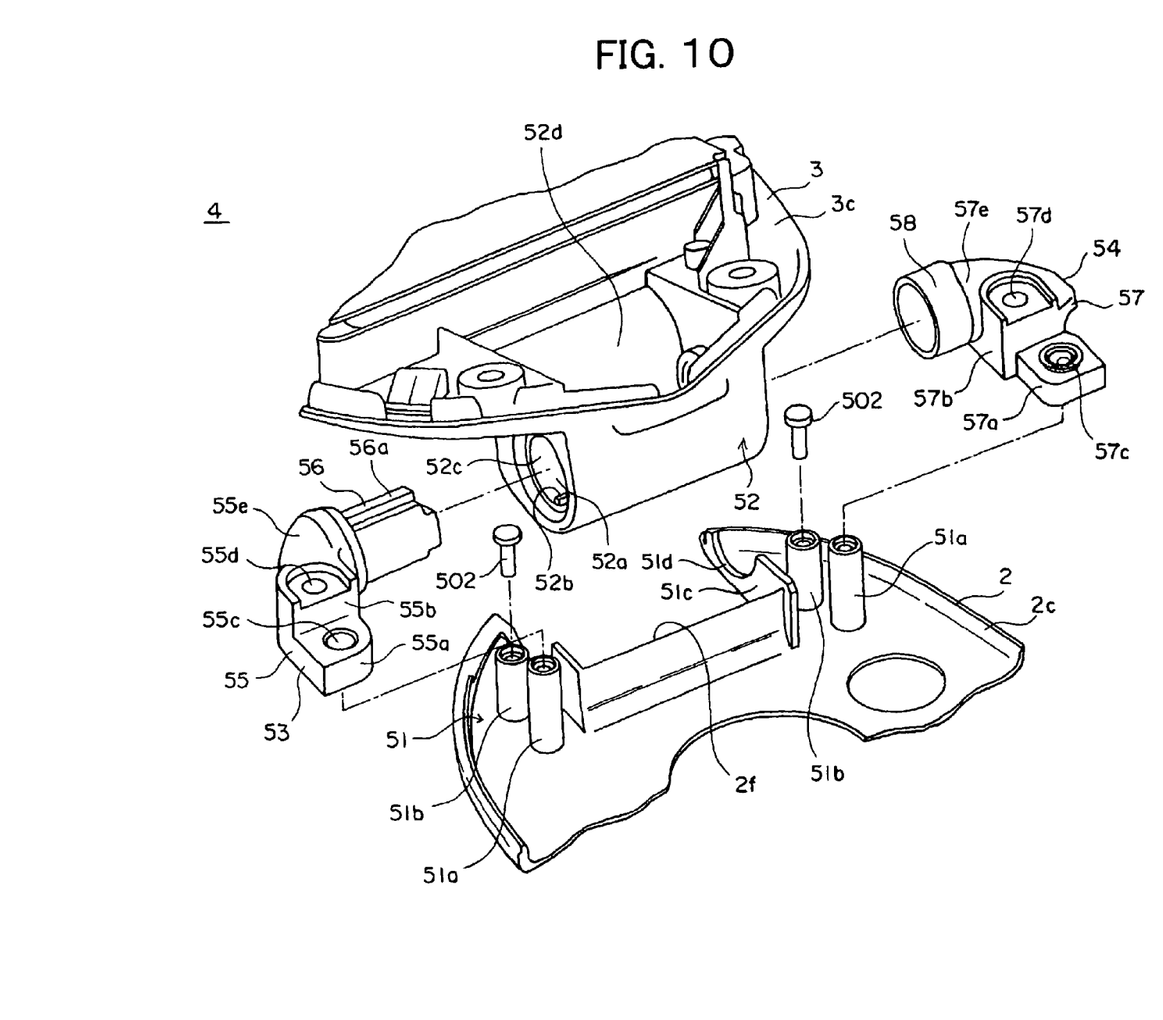
FIG. 10 is a disassembled perspective view showing a connection member of the mobile phone of FIG. 1.
Figure 11:
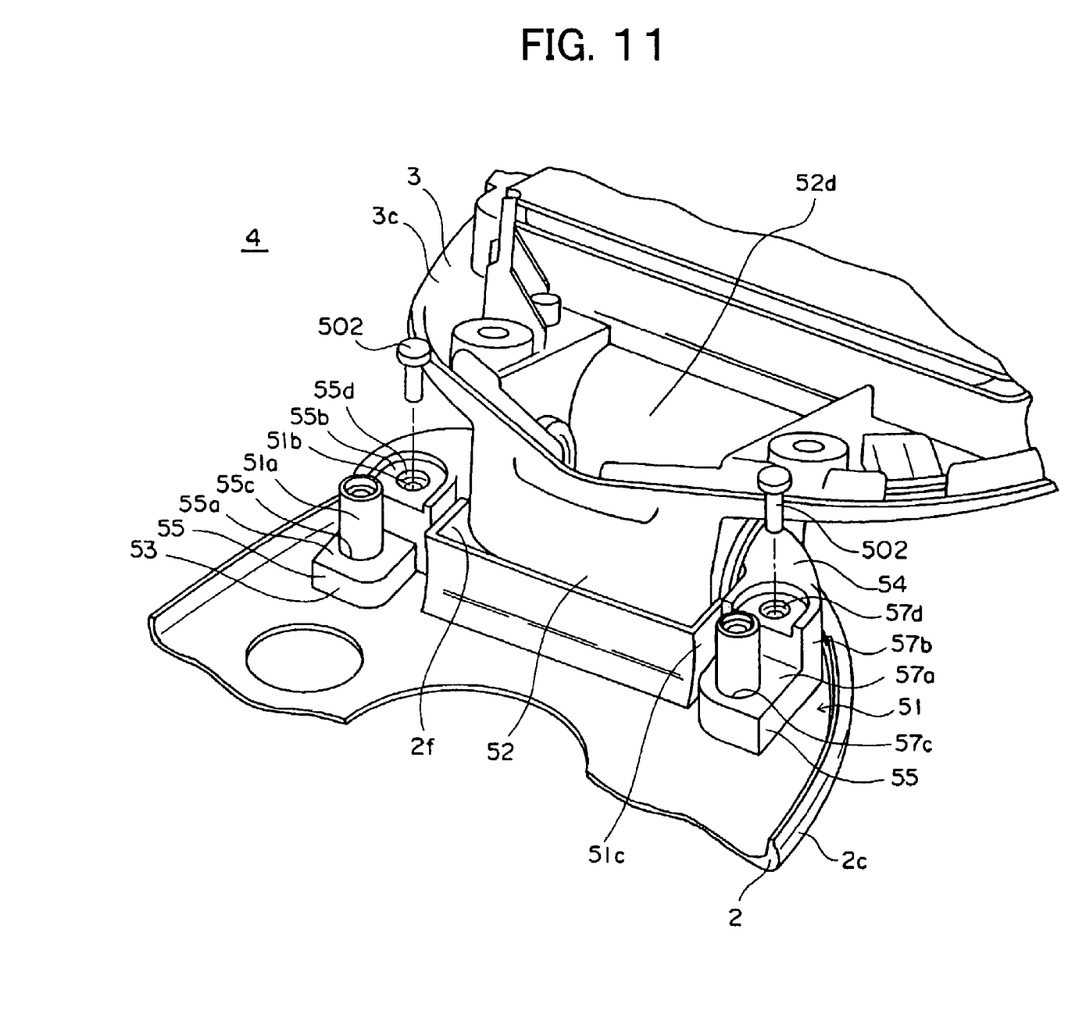
FIG. 11 is a perspective view showing a connection member of the mobile phone of FIG. 1.

FIG. 10 is a perspective view showing the hinge 4 disassembled, while FIG. 11 is a perspective view showing a state where it is partially assembled from the state of FIG. 10. The connection member 4 is provided with, as shown in FIG. 10 and FIG. 11, a first hinge portion 51 integrally provided with the first housing 2, a second hinge part 52 integrally provided with the second housing 3, and a first hinge part 53 and a second hinge part 54 as connection members.

The first hinge portion 51 is formed by the ends of the front surface case 2c and the back surface case 2d of the first housing 2 joined by fastening the front surface case 2c and the back surface case 2d to each other. Note that FIG. 10 and FIG. 11 are shown omitting the back surface case 2d. The first hinge portion 51 is provided projecting out from the connection end of the first housing 2 at two sides of a recess 2f formed at the center of the connection end for receiving the second hinge portion 52. The two parts of the first hinge portion 51 are provided corresponding to the first hinge part 53 and the second hinge part 54. Holes 51d in which the hinge parts 53 and 54 are fit are provided in walls 51c perpendicular to the pivoting axis of the first housing 2 and the second housing 3 among the walls surrounding the recess 2f. Further, the screw bosses 51a and 51b projecting from the front surface case 2c to the back surface case 2d side (upward in the figure) are provided substantially in a straight line in a direction substantially perpendicular to the pivoting axis.

The second hinge portion 52 is provided integrally with the front surface case 3c of the second housing 3. The second hinge portion 52 projects out from the front surface case 3c to the front surface side (downward in the figure) and is formed to a substantially cylindrical shape aligned in axis with the pivoting axis of the first housing 2 and the second housing 3. The second hinge portion 52 is formed with a hollow 52a, holes 52c opening from the hollow 52a to the outside of the housing at the two end faces of the cylinder, and a hole 52d opening from the hollow 52a to the inside of the housing at the side surface of the cylinder.

The first hinge part 53 is provided with a first housing part 55 fixed to the first housing 2 and a hinge module 56 pivotally provided with respect to the first housing part 55 and fastened to the second housing 3. The first housing part 55 is formed by for example integral shaping of a metal, while the second housing part as the hinge module 56 is formed by a plastic or the like and is rotatably fastened to the first housing part 55.

The first housing part 55 has a first fastening portion 55a having a through hole 55c and a second fastening portion 55b having a through hole 55d and having a height in the direction of the through hole larger than the first fastening portion 55a. The first fastening portion 55a and the second fastening portion 55b are formed to box shapes opening to the front surface case 2c side and are hollow inside.

The height of the second fastening portion 55b is set substantially equal to the height of the corresponding screw boss 51b plus the thickness of the second fastening portion 55b. When the second fastening portion 55b abuts against the front surface case 2c as shown in FIG. 6, the screw boss 51b abuts against the back surfaces of the through hole 55d. The screw 502 inserted into the through hole 55d is screwed with the screw boss 51b, whereby the second fastening portion 55b is fastened to the front surface case 2c.

The screw boss 51a is fit in the through hole 55c of the first fastening portion 55a. The part of the screw boss 51a projecting from the through hole 55c is further fit in the hole 32f of the hinge part fastening portion 32g (refer to FIG. 9). Then, as explained above, the screw 501 passed through the back surface case 2d is screwed with the screw boss 51a. The thickness of the height of the first fastening portion in the through hole 55c direction and the thickness of the hinge part fastening portion 32g added together is substantially equal to the distance between inner side surfaces of the front surface case 2c and back surface case 2d of the first housing 2. Accordingly, the first fastening portion 55a and the hinge part fastening portion 32g are fastened with the first housing 2 and fastened to each other by the screw 501. Note that the screw 501 is formed by for example a metal and has conductivity.

The first housing part 55 is further provided with a sliding portion 55e having a not shown hole opening to the axial direction of the second hinge portion 52. The sliding portion 55e is formed to a hollow shape. The hole of the sliding portion 55e has the hinge module 56 inserted into it so that it can slide in the circumferential direction of this hole, that is, a pivoting direction of the first housing 2 and the second housing 3. Note that the hinge module 56 is provided with various parts such as a biasing part or cam mechanism for causing a "click" feeling along with the opening/closing of the mobile phone 1.

The hinge module 56 is provided with an insert portion 56a inserted into the hollow 52a of the second hinge portion 52 via the hole 52c. The length of the insert portion 56a inserted in the axial direction of the second hinge portion 52 is set to a half of the length of the second hinge portion 52 or slightly shorter than that. The insert portion 56a is formed to a substantially columnar shape. The insert 56a is provided with a not shown groove extending in the axial direction of the second hinge portion 52. This groove engages with a ridge 52b provided at the second hinge portion 52, projecting out into the hollow 52a, and extending in the axial direction, whereby movement of the hinge module 56 with respect to the second hinge portion 52 in the circumferential direction is restricted.

The second hinge part 54 is provided with a base 57 and a sliding portion 58 fit in the base 57. The base portion 57 is formed by a metal, while the sliding portion 58 is formed by a plastic or hard rubber.

In the same way as the first housing part 55 of the first hinge part 53, the base 57 is provided with a first fastening portion 57a having a through hole 57c and a second fastening portion 57b having a through hole 57d and having a height in the direction of the through hole larger than the height of the first fastening portion 57a. It is fixed to the first housing 2 by screwing the screws 501 and 502 passed through the through holes 57c and 57d with the screw bosses 51a and 51b. The setting of the heights of the first fastening portion 57a and the second fastening portion 57b and the first fastening portion 57a and the hinge part fastening portion 32g of the shield case 32 being fastened by fastening with the first housing 2 by the screw 501 are the same as in the first housing part 55.

Figure 12:
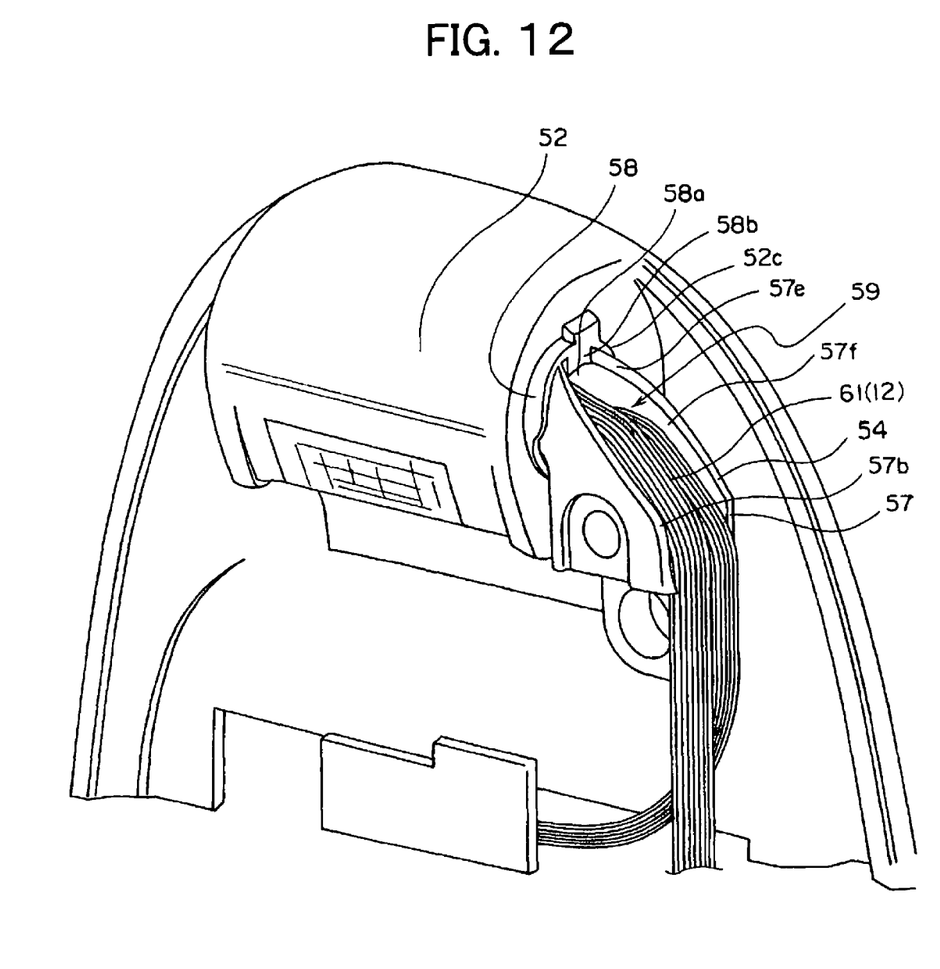
FIG. 12 is a perspective view showing a state of connection with a second hinge part and a second hinge part of the mobile phone of FIG. 1.
Figure 13:
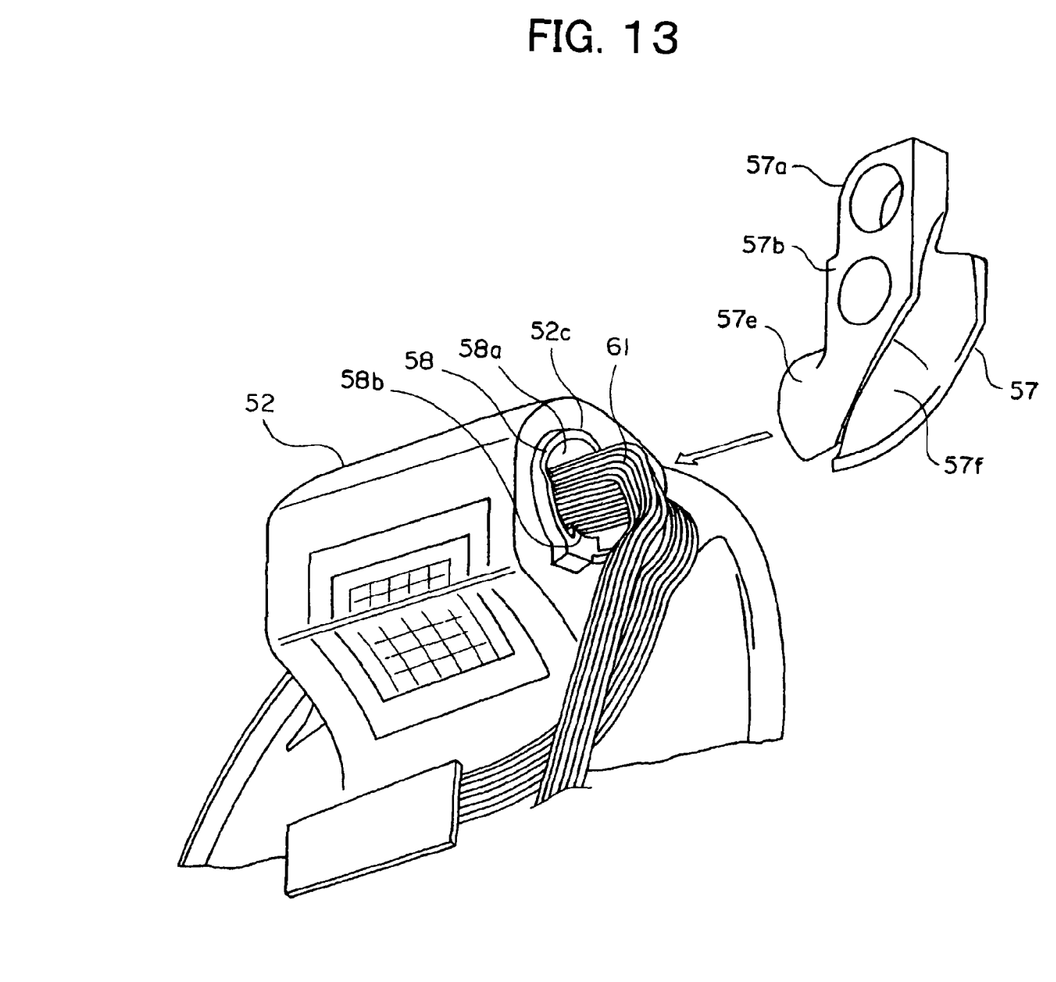
FIG. 13 is a disassembled perspective view shown partially disassembled from the state of FIG. 12.

FIG. 12 is a perspective view showing a connection state of the second hinge portion 52 and the second hinge part 54, while FIG. 13 is a disassembled perspective view shown partially disassembled from the state of FIG. 12.

The base 57 is further provided with an insert portion 57e inserted into the hollow 52a from the hole 52c of the second hinge portion 52. The insert portion 57e provided on the base 57 is fit in the hole 58a of the sliding portion 58 and inserted into the hole 52c via the sliding portion 58. A groove 57f is formed on the side along the outer edge of the first housing 2 from the insert portion 57e to the second fastening portion 57b. The sliding portion 58 is provided with a ridge 58b projecting out to the hole 58a and fitting with the edge of the groove 57f at the position on the insert portion 57e side. By fitting this ridge 58b with the edge of the groove 57f, movement of the sliding portion 58 with respect to the base 57 in the circumferential direction of the hole 58a is restricted. The sliding portion 58 can be fit in the hole 52c of the second hinge portion 55 and slide in the circumferential direction of the second hinge portion 52, that is, the pivoting direction of the first housing 2 and the second housing 3.

Note that the lengths of insertion of the insert portion 57e and the sliding portion 58 into the second hinge portion 52 are about 1/10 of the length in the axial direction of the second hinge portion 52.

By the groove 57f or by the groove 57f and the hole 58a of the sliding portion 58, a passageway 59 connecting the inside of the first housing 2 and the inside of the second housing 3 is formed inside the hinge part 54. The passageway 59 has a plurality of signal lines (connection members) 61 for electrically connecting the circuit board 31 of the first housing 2 with electronic parts such as the drive unit 42 of the second housing 3 arranged in it. Note that the signal lines 61 are inserted into the holes 52c and 52d of the second hinge portion 52 and the hole 58a of the sliding portion 58. Further, the passageway 59 formed in the base 57 is formed by the groove 57f, therefore, at the time of assembly of the mobile phone 1, as shown in FIG. 13, it is possible to attach the base 57 even after the signal lines 61 are connected to the circuit board 31 and the electronic parts of the second housing 3. The signal lines 61 are constituted by for example a thin coaxial cable 12 comprised of metal wires covered by an insulator.

As explained above, the base 57 etc. of the second hinge part 54 are formed by a metal. The signal lines 61 formed by the thin coaxial cable 12 are arranged so that their outer coatings made of the insulator contact the base 57 functioning as the conductive member 4a. Accordingly, as explained with reference to FIG. 3, for example the signal lines 61 (cable 12) appear to start from the upper end of the hinge 4 in terms of high frequency, so a high frequency current smoothly flows in the second housing 3 different from the case of FIG. 4. In this way, by a smooth flow of the high frequency current, the antenna gain is improved. The connection member 4 and the wires of the signal lines 61 (cable 12) need not be directly connected. High frequency current flows and it is possible to raise the antenna gain so far as they are in close contact.

The present invention is not limited to the above embodiment and can be modified in various aspects. For example, the present invention is not limited to a mobile phone and can be applied to various other electronic devices such as PHS phones, PDA's, and game devices. The electronic devices which can be opened/closed are not limited to the flip-open type as in the present embodiment. They may be connected by a connection member so that the housings can move relative to each other between the closed state where two or more housings are superimposed on each other and the opened state where at least a portion among portions facing each other in this closed state is exposed. Accordingly, for example, the present invention includes a so-called horizontal rotation type where the first housing and the second housing are rotated so as to slide along the facing surfaces.

The signal lines 61 may electrically connect the circuit board 31 of the first housing and electronic parts inside the second housing and may be for example a flexible circuit board as well. The conductive member need only be one having conductivity. It is not limited to a metal mesh or punched piece of metal.

It should be understood by those skilled in the art that various modifications, combinations, sub-combinations and alterations may occur depending on design requirements and other factors insofar as they are within the scope of the appended claims or the equivalents thereof.

What I claim is:

1. A wireless terminal comprising:
a first housing including a first circuit board therein;
a second housing including a second circuit board therein;
a connection member comprising;
   a conductive member comprising a groove; and
   a non-conductive member,
wherein both the conductive member and the non-conductive member directly connect ends of the first housing and the second housing with each other so that the housings open and close with respect to each other;
a built-in antenna in the first housing or the second housing, arranged at the end on an opposite side to the connection member;
a first ground conductive layer on the first circuit board; a second ground conductive layer on the second circuit board; and
a signal line electrically connecting the first ground conductive layer and the second ground conductive layer, wherein the signal line is arranged inside of the groove of the conductive member of connection member.

2. The wireless terminal according to claim 1, wherein a first electrical/audio converter is inside the first housing, and a second electrical/audio converter is inside the second housing.

3. The wireless terminal according to claim 2, wherein the built-in antenna is inside the first housing, the first electrical/audio converter includes a microphone, and the second electrical/audio converter includes a speaker.

4. A wireless terminal comprising:
a first housing including a first circuit board therein;
a second housing including a second circuit board therein;
a connection member comprising;
   a conductive member comprising a groove; and
   a non-conductive member,
wherein both the conductive member and the non-conductive member directly connect ends of the first housing and the second housing with each other so that the housings open and close with respect to each other;
a built-in antenna in the first housing or the second housing, arranged at the end on an opposite side to the connection member;
a first ground conductive layer on the first circuit board; a second ground conductive layer on the second circuit board; and a signal line electrically connecting the first ground conductive layer and the second ground conductive layer, wherein the signal line is arranged inside of the groove of the conductive member of connection member, wherein the signal line is a coaxial cable.

5. A wireless terminal comprising:
a first housing including a first circuit board therein;
a second housing including a second circuit board therein;
a connection member comprising;
   a conductive member comprising a groove; and
   a non-conductive member,
wherein both the conductive member and the non-conductive member directly connect ends of the first housing and the second housing with each other so that the housings open and close with respect to each other;
a built-in antenna in the first housing or the second housing, arranged at the end on an opposite side to the connection member;
a first ground conductive layer on the first circuit board;
a second ground conductive layer on the second circuit board;
a signal line electrically connecting the first ground conductive layer and the second ground conductive layer, wherein the signal line is arranged inside of the groove of the conductive member of connection member, wherein the signal line is a coaxial cable;
a first electrical/audio converter is inside the first housing; and
a second electrical/audio converter is inside the second housing.

6. The wireless terminal according to claim 1, wherein the conductive member of the connection member is inside one housing and is electrically connected to the ground conductive layer of the circuit board arranged in the one housing.

7. The wireless terminal according to claim 6, wherein the circuit board arranged in the one housing is provided with a shield case, and the conductive member of the connection member and the signal line are connected through the shield case.

8. The wireless terminal according to claim 1, wherein the first housing and the second housing are pivotally connected so that the housings open and close, and the conductive member of the connection member forms a pivoting axis supporting the pivotal operations of the housings.

9. The wireless terminal according to claim 4, wherein the ground conductive member is formed by a coaxial cable, a guide groove is formed on the pivoting axis constituting the conductive member, and the coaxial cable is arranged in the guide groove.

10. The wireless terminal according to claim 2, wherein the conductive member of the connection member is inside one housing and is electrically connected to the ground conductive layer of the circuit board arranged in the one housing.

11. The wireless terminal according to claim 10, wherein the circuit board arranged in the one housing is provided with a shield case, and the conductive member of the connection member and the signal line are connected through the shield case.

12. The wireless terminal according to claim 2, wherein the first housing and the second housing are pivotally connected so that the housings open and close, and the conductive member of the connection member forms a pivoting axis supporting the pivotal operations of the housings.

13. The wireless terminal according to claim 5,
wherein the ground conductive member is formed by a coaxial cable, a guide groove is formed on the pivoting axis constituting the conductive member, and the coaxial cable is arranged in the guide groove.

14. A wireless terminal, comprising:
a first high frequency current flow path on a first circuit board inside a first housing;
a second high frequency current flow path on a second circuit board inside a second housing;
a connection member comprising;
  a conductive member comprising a groove; and
  a non-conductive member,
wherein both the conductive member and the non-conductive member directly connect ends of the first housing and the second housing with each other so that the housings open and close with respect to each other;
wherein the connection member connects the first high frequency current flow path and the second high frequency current flow path;
an antenna in the first housing, aligned with the first current flow path; and
a signal line arranged inside of the groove of the conductive member of connection member for reducing high frequency current distribution along the connection member.

15. The wireless terminal according to claim 14,
wherein the high frequency current flows from one end of the first high frequency current flow path near the antenna to the far end of the second high frequency current flow path.

16. The wireless terminal according to claim 14,
wherein a conductive sheet is underneath the first circuit board.

* * * * *